No. 781,685.
PATENTED FEB. 7, 1905.
D. L. SHIRLEY & J. O. JOHNSON.
GLASS FORMING MACHINE.
APPLICATION FILED APR. 2, 1902.
6 SHEETS—SHEET 2.
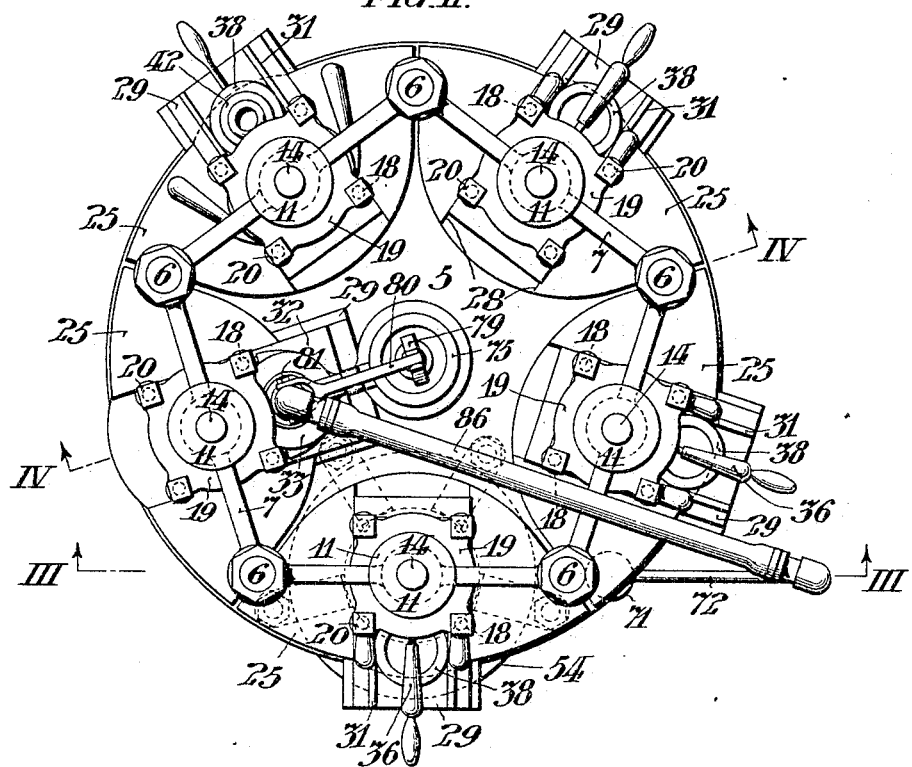
WITNESSES:
Clifton C. Hallowell
Edward Rittenhouse
INVENTORS:
DAVID L. SHIRLEY
AND
JESSE O. JOHNSON,
by Arthur E. Paige
Atty.

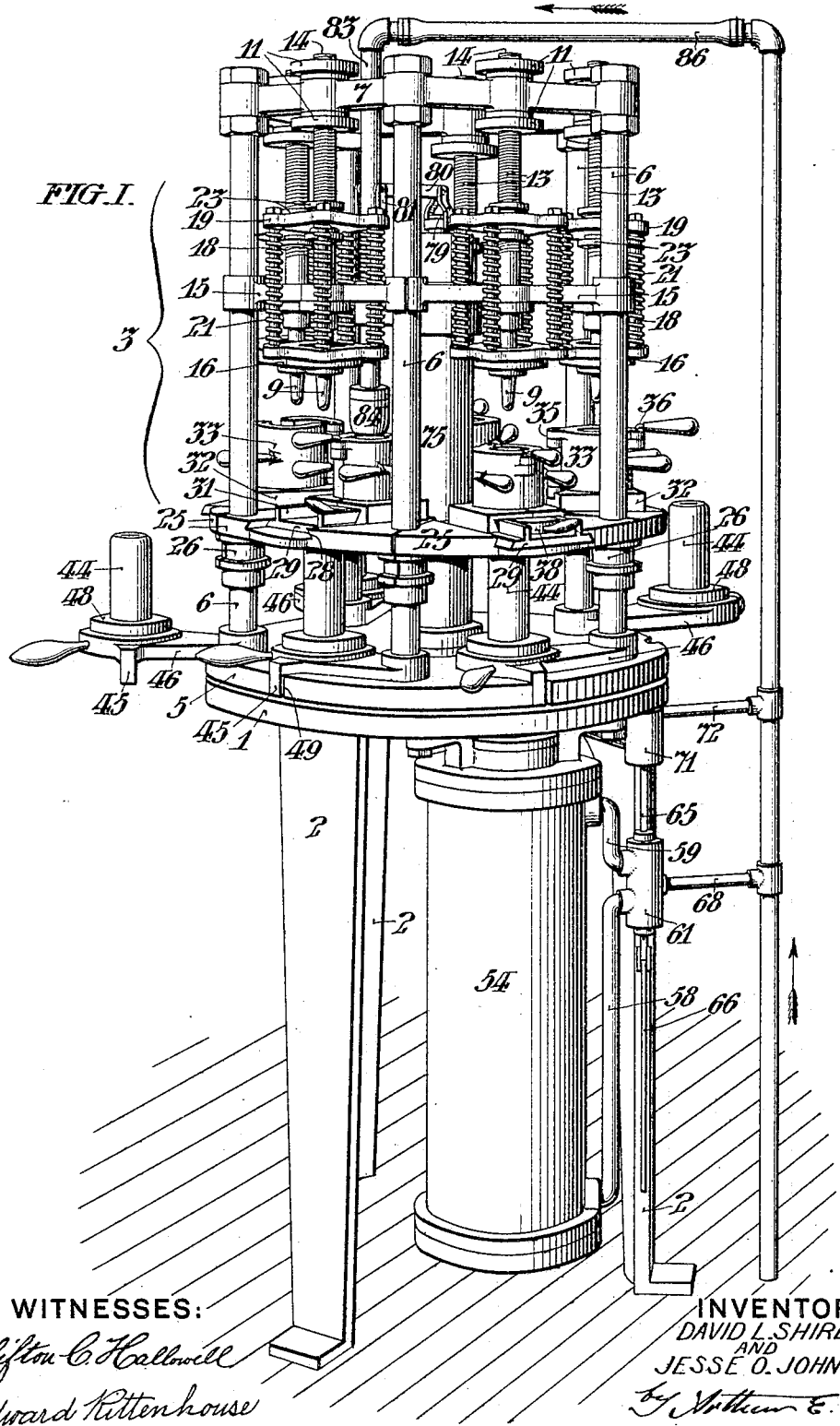

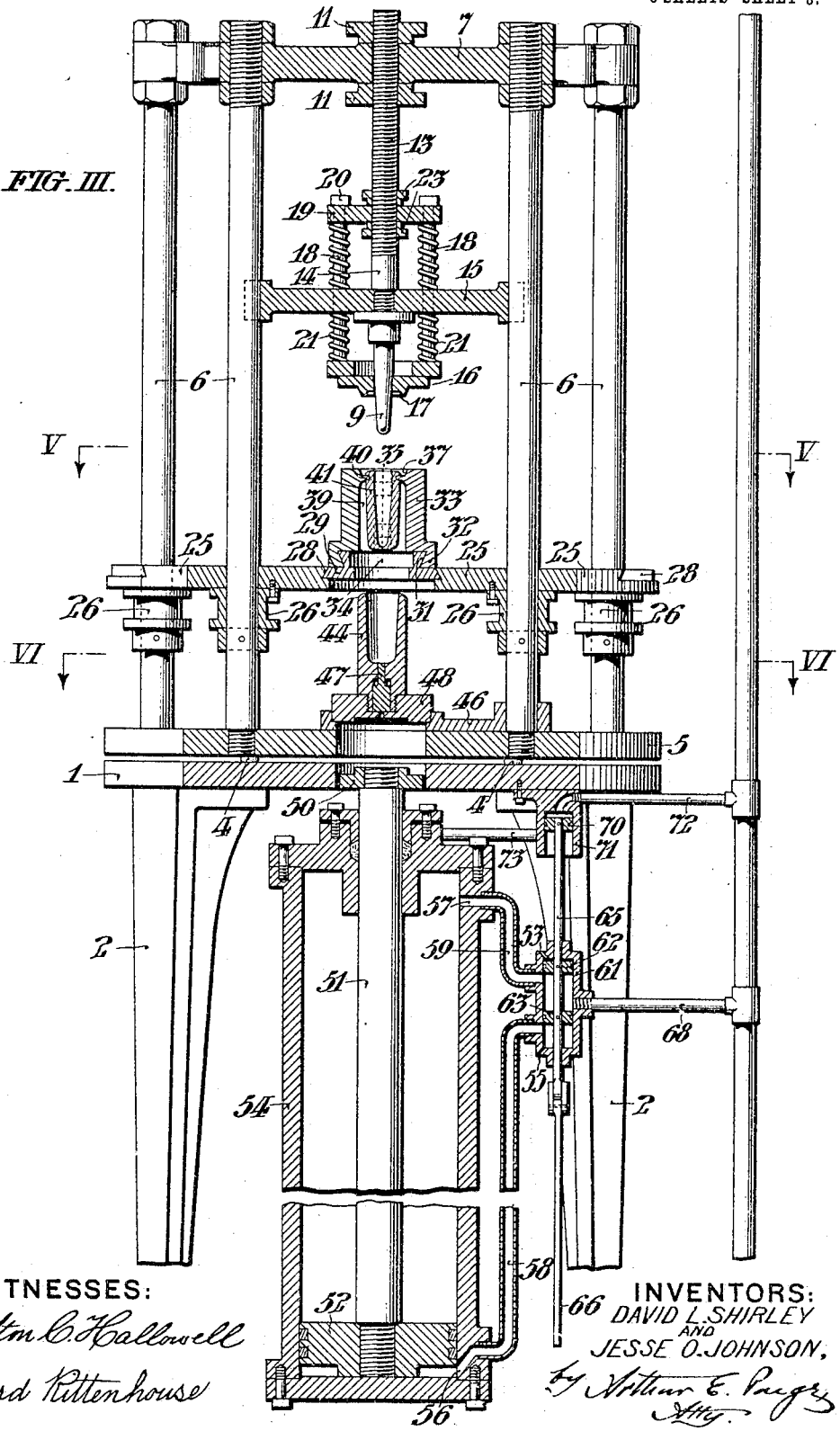

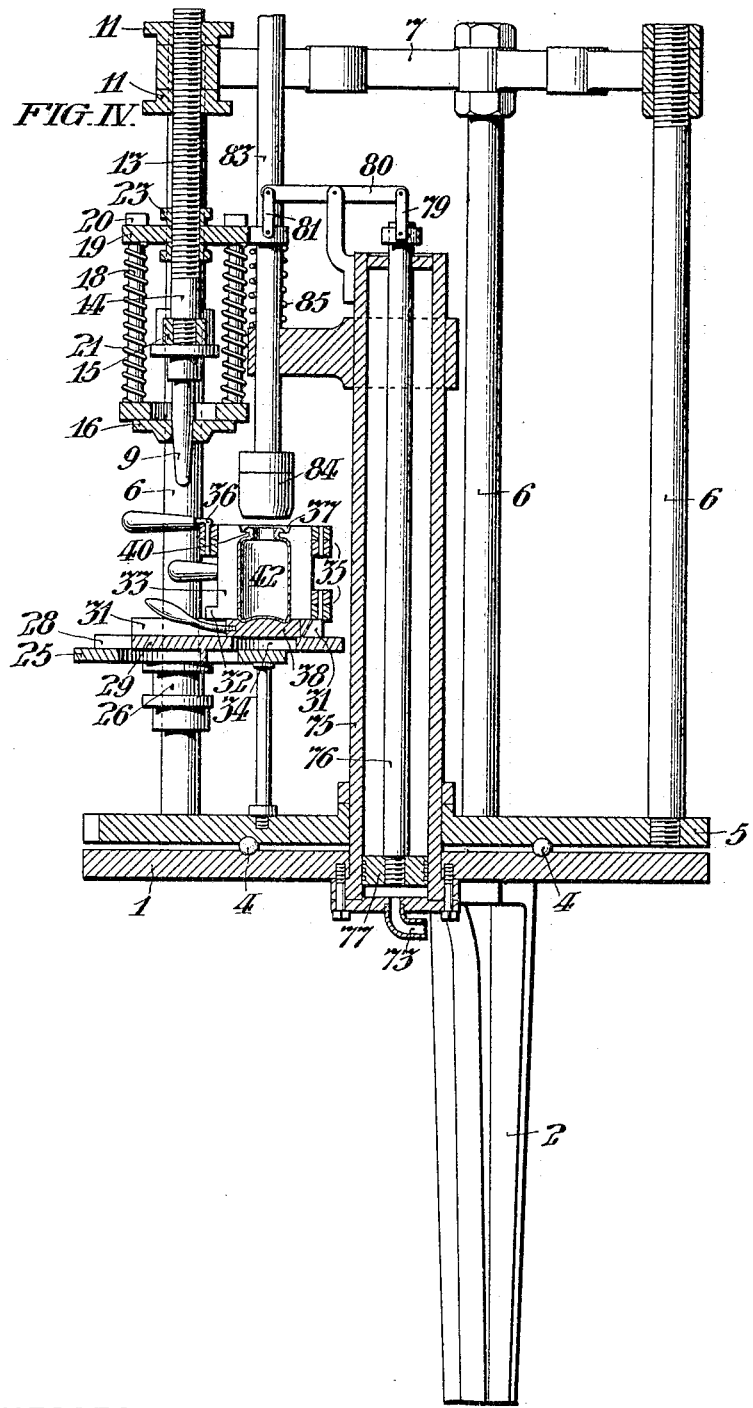

No. 781,685. PATENTED FEB. 7, 1905.
D. L. SHIRLEY & J. O. JOHNSON.
GLASS FORMING MACHINE.
APPLICATION FILED APR. 2, 1902.
6 SHEETS—SHEET 5.
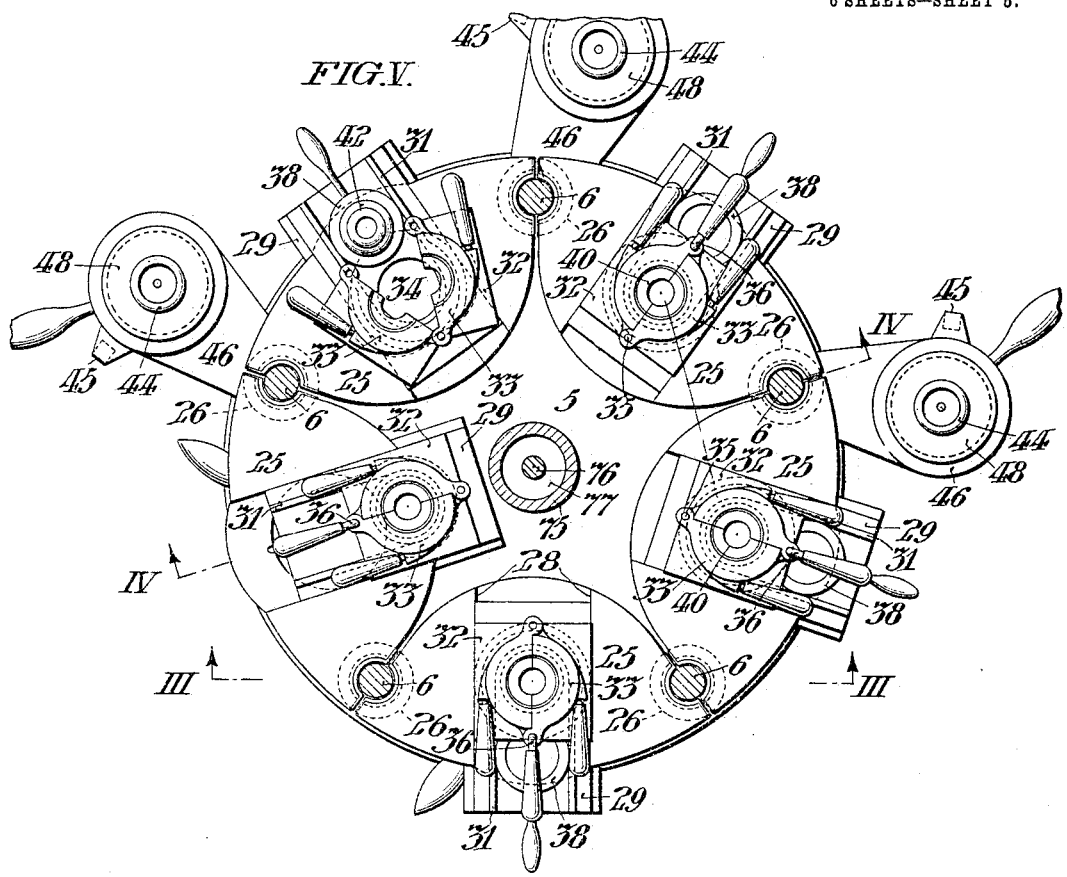
FIG. V.
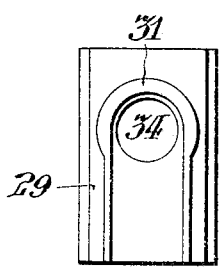
FIG. VIII.
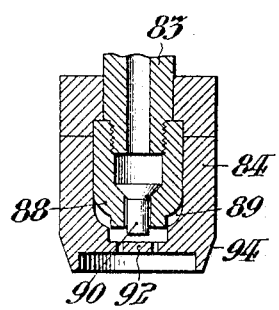
FIG. X.
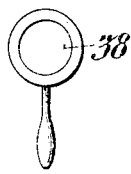
FIG. IX.
WITNESSES:
Clifton C. Hallowell
Edward Rittenhouse
INVENTORS:
DAVID L. SHIRLEY
AND
JESSE O. JOHNSON,
by Arthur E. Paige
Atty.

No. 781,685. PATENTED FEB. 7, 1905.
D. L. SHIRLEY & J. O. JOHNSON.
GLASS FORMING MACHINE.
APPLICATION FILED APR. 2, 1902.
6 SHEETS—SHEET 6.
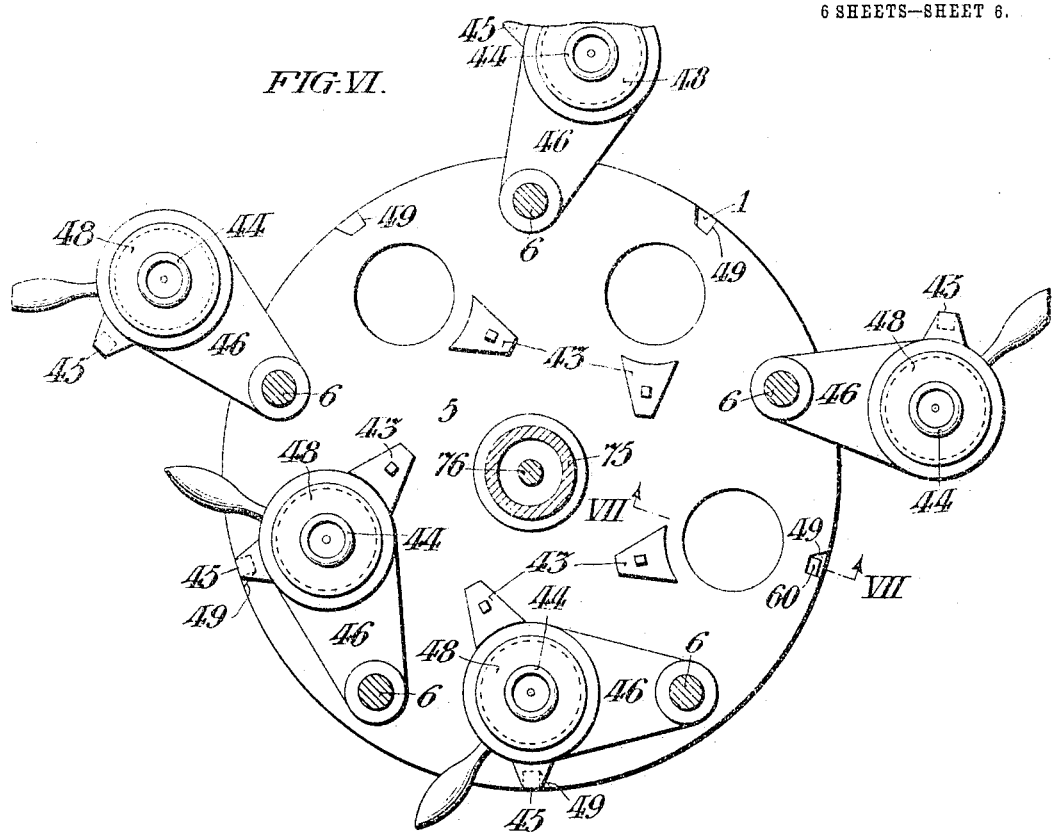
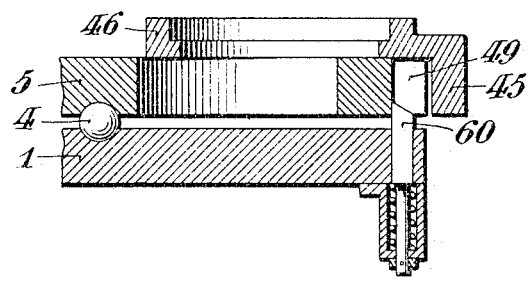
WITNESSES:
Clifton C. Hallowell
Edward Rittenhouse
INVENTORS:
DAVID L. SHIRLEY
AND
JESSE O. JOHNSON No. 781,685. Patented February 7, 1905.

UNITED STATES PATENT OFFICE.

DAVID L. SHIRLEY AND JESSE O. JOHNSON, OF BRIDGETON, NEW JERSEY, ASSIGNORS OF ONE-THIRD TO HENRY CLAY FRY, OF ROCHESTER, PENNSYLVANIA.

GLASS-FORMING MACHINE.

SPECIFICATION forming part of Letters Patent No. 781,685, dated February 7, 1905.

Application filed April 2, 1902. Serial No. 101,096.

*To all whom it may concern:*

Be it known that we, DAVID L. SHIRLEY and JESSE O. JOHNSON, of Bridgeton, in the State of New Jersey, have invented certain new and useful Improvements in Glass-Forming Machines, whereof the following is a specification, reference being had to the accompanying drawings.

Our improvements relate to machines for pressing glass blanks and blowing such blanks in molds to form hollow-ware articles.

It is the object of our invention to provide a machine wherein a plurality of glass-forming molds and plungers are so disposed as to be contemporaneously operated in such definite relation to each other as to effect the maximum production of articles from the labor of each operator and to insure the cooling of each of the mold members during a portion of the cycle of its operation without interrupting the continuity of operation of the machine.

The form of our invention hereinafter described comprises the combination, with a rotary frame, which carries a series of similar sets of press-mold and blow-mold members, of means to rotate said frame and successively operate the mold sets by means of pistons which are reciprocated in stationary cylinders to respectively effect the pressing and blowing operations.

Our invention comprises the various novel features of construction and arrangement hereinafter set forth.

In the accompanying drawings, Figure I is a perspective view of a machine conveniently embodying our improvements. Fig. II is a plan view of said machine. Fig. III is a vertical sectional view of said machine, taken on the line III III in Fig. II. Fig. IV is a vertical sectional view of said machine, taken on the line IV IV in Fig. II. Fig. V is a plan sectional view taken on the line V V in Fig. III. Fig. VI is a plan sectional view taken on the line VI VI in Fig. III. Fig. VII is a fragmentary sectional view taken on the line VII VII in Fig. VI, showing means for locking the rotary mold-carrier frame to the stationary bedplate. Fig. VIII is a plan view of a blow-mold carriage. Fig. IX is a plan view of the removable bottom plate of a blow-mold. Fig. X is a vertical sectional view of the blow-head. Fig. XI is a plan view showing means to rotate the blank-mold plungers.

In said figures, 1 is the stationary bed-plate, provided with the legs 2. The mold-carrier frame 3, being provided with the ball-bearings 4, is mounted to rotate on said bed-plate 1. Said rotary frame 3 comprises the moldtable 5 and the standards 6, which latter are fixed in said table and united at their upper extremities by the spider-frame 7. The blank-mold plungers 9 are supported by said spider-frame 7 respectively intermediate of adjoining standards 6, and each of said plungers is vertically adjustable through said frame 7 by means of the nuts 11, fitted to the screw-thread 13 on the shank of said plunger. Said plungers 9 are supported near their lower extremities by respectively independent yoke-bars 15, slidably engaged with the adjoining standards 6.

The mold-rings 16 are respectively disposed in concentric relation with the respective plungers 9, and each ring is provided with four guide-rods 18, extending through a supporting-plate 19. Said rods 18 are provided with heads 20 to limit the downward movement of the ring 16 under the pressure of the buffersprings 21, which surround said rods. Each mold-ring 16 may be vertically adjusted by means of the nuts 23, disposed above and below said plates 19 in engagement with the screw-thread 13 upon the shank 14 of the plunger 9.

The cross-heads 25 are each mounted for reciprocation upon two of said standards 6, being respectively provided with semicylindrical bearings 26, engaged with said standards. Said cross-heads are sectoral in form, as shown in Figs. II and V, and are each provided with a radial slideway 28 for a moldcarriage 29. Each of said carriages 29 is provided with an upwardly-projecting undercut flange 31, as shown in Figs. III and VIII, fitted to engage the bisected bottom flanges 32 of the blow-molds 33. Each of said flanges 31 incloses a recess 34 in concentric relation with the blow-mold 33 engaged therewith, and said flanges 31 extend parallel with the axis of reciprocation of the carriage 29 to form slideways for the removable bottom plate 38 for the blow-mold 33, secured upon said carriage. Said bottom plates are withdrawn in their respective slideways during the pressing operation, but are inserted in said recesses 34 during the blowing operation. Said molds 33 are conveniently formed of opposed semicylindric sections hinged at 35 and normally secured in closed position upon said flanges 31 by locking-hooks 36, inserted in suitable lugs upon the mold-sections. Each of said blow-molds 33 comprises an internal recess 39, which determines the shape of the glass article blown therein, and the annular flange 40 at the top of said recess serves to support and retain the glass blank 41 in the blow-mold 33 during and after the pressing operation.

The blank-molds 44 are respectively supported intermediate of adjoining standards 6, and below the cross-heads 25 by means of the respective plates 46, which are mounted to oscillate upon respective standards 6, and are provided with stops 43 upon the table 5 to insure the alinement of said molds 44 with the plungers 9. As best shown in Fig. III, each of said molds 44 is provided with a loosely-fitted vent-valve or plug 47, to permit the passage of air around said plug 47 when the blank 41 is pressed and when it is withdrawn from the mold. Each of said molds 44 is provided with a base-flange 48, arranged to register with and be engaged by the cap-plate 50 upon the press piston-rod 51. Said piston-rod 51 is provided with the piston 52, fitted within the cylinder 54, which latter is disposed beneath and supported by the bed-plate 1. Said cylinder 54 is provided with ports 56 and 57, respectively, at the bottom and top thereof, and said ports are connected by the conduits 58 and 59 with the valve-casing 61, within which the valves 62 and 63 are mounted upon the valve-stem 65. Said valve-stem 65 may be conveniently operated by a foot-treadle provided with the connecting-rod 66, and the arrangement is such that said valve mechanism serves to control the admission of air or other fluid-pressure from the pipe 68 to the cylinder 54 to reciprocate the piston 52 in said cylinder. Said valve-stem 65 is also provided with the valve 70, arranged to reciprocate within the valve-casing 71 to control the admission of fluid-pressure from the pipe 72 through the pipe 73 to the cylinder 75. The piston-rod 76 is provided with the piston 77, fitted within said cylinder 75, and said piston-rod 76 is connected by the links 79, lever 80, and links 81 with the tubular stem 83, which carries the blow-head 84, and is connected with the supply of fluid-pressure by the flexible conduit 86. It is to be understood that said stem 83 and blow-head 84 may be lowered by admitting fluid-pressure to the cylinder 75 beneath the piston 77 to uplift the latter, the parts being normally maintained in the position shown in Fig. IV by the spring 85. As shown in Fig. X, said stem 83 terminates in the valve-casing 88, within the recess 89 in the blow-head 84. Said casing 88 serves to normally suspend the blow-head 84 in the position shown in Fig. X; but said casing may be reciprocated independently of said head, as hereinafter described. The lower extremity of said head 84 is tapered, as indicated at 94, to make an air-tight joint with the blow-mold 33 when said head is lowered into the seat 37 in the top of said blow-mold. The passage of fluid-pressure through the blow-head 84 is automatically controlled by the valve 90, the arrangement being such that when said head 84 is lowered into connection with the blow-mold 33 the stem 83 may be further lowered until the valve 90 is opened by encountering the perforated diaphragm 92 in the bottom of said head 84, and fluid-pressure be thus admitttd to the glass blank 41 to expand said blank, as hereinafter described.

The mechanism above described operates as follows: One of the oscillatory plates 46 being swung outwardly, with its blank-mold 44 in the position shown at the right-hand side of Fig. V, a quantity of molten glass sufficient to form the desired blank 41 is deposited within said mold. The plate 46 is then oscillated upon its supporting-standard 6 into axial alinement with its respective plunger 9 within the rotary frame 3, the proper position being determined by the stop 43. The depending lug 45 upon said plate 46 rides over and depresses the locking-bolt 60 from the recess 49 in the periphery of the table 5, and thus unlocks the rotary mold-carrier frame 3 from the stationary bed-plate 1. Said frame 3 is then rotated one-fifth of a revolution and is again locked by the engagement of said locking-bolt 60 in the next locking-recess 49 corresponding to the next mold 44, carried by the table 5. Said partial rotation of the mold-carrier frame 3 presents the blank-mold 44, containing the molten glass, in registry with the press piston-rod 51. The bottom plate 38 of the mold 33 being withdrawn to the outer end of its carriage 29, the operator lowers the valves 62 63 by the rod 66, and thereby admits fluid-pressure beneath the piston-head 52 and exhausts the upper portion of the cylinder 54 through the exhaust-port 53 in the valve-casing 61. Thereupon the piston-rod 51 being uplifted its cap-plate 50 engages the flange 48 of the blank-mold 44, uplifts the latter until it enters the recess 39 of the blow-mold 33, encounters the flange 40 at the top of the latter, and uplifts said blow-mold 44, together with its carriage 29 and cross-head 25, until the conical flange 17 upon the mold-ring 16 is entered in the seat 37 in the blow-mold 33. Continued upward traverse of the molds, assembled as aforesaid, causes the stationary plunger 9 to enter the blank-mold 44 within the blow-mold 33 and press the molten glass into the blank form 41. (Shown in Fig. III.) The valve-stem 65 being then uplifted to the normal position shown in Fig. III, the lower portion of the cylinder 54 is exhausted through the exhaust-port 55 in the valve-casing 61 and fluid-pressure being admitted through the port 57 above the piston 52, the piston-rod 51 is lowered to the normal position shown in Fig. III. The retreat of the blank-mold members 9 and 44 from the blow-mold 33 leaves the pressed-glass blank 41 deposited within the blow-mold in engagement with the flange 40, as shown in Fig. III. In the meantime a proper quantity of molten glass having been deposited in the succeeding blank-mold 44 its supporting-plate 46 is swung into the unlocking position, and its depending lug 45 unlocks the bolt 60 and releases the frame 3, which latter is rotated another one-fifth revolution. The movable bottom plate 38 of the blow-mold 33 being then thrust radially inward into the recess 34 beneath the blow-mold 33, containing the pressed-glass blank 41, the carriage 29 is shifted radially inward, as indicated at the left-hand side of Figs. IV and V, in which position said blow-mold 33 is in vertical alinement with the blow-head 84. The valve-stem 65 being again lowered, the molten glass in the next blank-mold 44 is pressed to form a blank 41 in its corresponding blow-mold 33, and simultaneously therewith fluid-pressure is admitted beneath the piston 77 to uplift the piston-rod 76 and through the lever 80, &c., lower the stem 83 and blow-head 84 until the conical lower extremity 94 of the head 84 is engaged with the corresponding seat 37 in the top of the blow-mold 33 and makes an air-tight joint therewith. Continued downward traverse of the stem 83 causes the valve 90 to encounter the perforated diaphragm 92 in the bottom of said head 84, uplifts said valve 90, and admits the fluid-pressure through said blow-head 84 to within the glass blank 41, causing the latter to be distended to form the completed article 42, filling the recess 39 in the blow-mold 33, as shown in Fig. IV. It is to be noted that the lower extremity of the valve-casing 88 serves as a valve to prevent the escape of the fluid-pressure between said casing and the head 84 during the blowing operation, said casing 88 being seated in the bottom of the recess 89 contemporaneously with the opening of the valve 90, as above described. The contemporaneous operations of blowing the blank in the first blow-mold and pressing the blank in the second blow-mold being completed, the valve-stem 65 is again uplifted, the pressure is exhausted from the cylinder 75 through the pipe 73 and valve-casing 71, and the spring 85 uplifts the tubular stem 83 and blow-head 84 to the normal position. (Shown in Fig. IV.) The mold-carrier frame 3 being then rotated another one-fifth revolution, the second blank is blown and a third blank pressed in their respective molds, while the first completed article 42 is removed from the blow-mold 33 by withdrawing the locking-hook 36 of said mold, opening the latter, as indicated at the upper left-hand side of Fig. V, and withdrawing said article 42 upon the slidable bottom plate 38, from which it may be uplifted and removed. The blow-mold 33 is thereupon closed upon the flange 31 of its carriage 29 and secured by the reengagement of its locking-hook 36 with the lugs of the mold-sections. The operator who closes said mold 33 also swings the supporting-plate 46 of the corresponding blank-mold 44 outwardly from the frame 3, as indicated in Fig. V. The blank-mold and blow-mold remain idle, and are thus cooled during the succeeding two-fifths rotation of the frame 3 before the first blank-mold 44 is again presented in the position shown at the right-hand side of Fig. V to receive a new supply of molten glass.

The various operations above described are successively and contemporaneously effected, so that five completed articles 42 are formed during each revolution of the frame 3, which carries five sets of mold members. It is to be understood, however, that said frame may be arranged for a greater or less number of molds.

Although, as above described, the mold-plungers 9 remain stationary during the formation of the glass blanks 41 therewith and, as shown, are so shaped as to form smooth recesses in the blanks it is obvious that said plungers may be suitably shaped and be rotated during the withdrawal of the blank-molds 44 therefrom to form screw-threaded recesses in the glass blanks adapted to receive a screw-threaded cap or plug. For instance, the shanks 14 of the plungers 9 may be provided with gear-pinions 97, adapted to be alternately rotated in opposite directions by engagement with the sectoral racks 98 99. (Shown in Fig. XI.) The blank-mold plunger 9 and blank-mold 44 must of course be relatively movable to effect the pressing operation; but it is immaterial which of said mold members is fixed with respect to the frame 3. For instance, the blank-mold may be stationary and the plunger be reciprocated.

We do not desire to limit ourselves to the precise construction or arrangement of the mechanism hereinbefore set forth, as it is obvious that various modifications may be made therein without departing from the essential features of our invention.

We claim—

1. In a glass-press, the combination with a bed-plate; of a mold-carrier frame arranged to rotate on said bed-plate; a series of blow-molds carried by said frame, and each movable radially in said frame; a blank-mold; a blow-head; said blank-mold and blow-head being at different radial distances from the center of rotation of said frame; and means to carry each of said blow-molds radially with respect to said frame to successively register with a blank-mold, and with said blow-head, substantially as set forth.

2. In a glass-press, the combination with a rotatable frame; of a blow-mold, carried by said frame and arranged to reciprocate therein; a mold-plunger above said blow-mold, in said frame; and a blank-mold, arranged to reciprocate in said frame below said blow-mold; said mold-plunger and blank-mold being arranged to coöperate with said blow-mold, substantially as set forth.

3. In a glass-press, the combination with a rotatable frame; of a blow-mold, carried by said frame; a mold-plunger above said blow-mold, in said frame; and a blank-mold, arranged to oscillate in said frame below said blow-mold; said mold-plunger and blank-mold being arranged to coöperate with said blow-mold, substantially as set forth.

4. In a glass-press, the combination with a press-piston; of a cross-head arranged to register with said press-piston; a carriage mounted to slide in said cross-head; a blow-mold mounted upon said carriage; a slideway in said carriage, terminating in a recess in concentric relation with said blow-mold; a removable bottom plate for said blow-mold, mounted in said slideway and arranged to be presented in said recess and to be withdrawn therefrom, substantially as set forth.

5. In a glass-press, the combination with a bed-plate; of a mold-carrier frame, arranged to rotate on said bed-plate comprising a series of vertical standards fixed in said frame; a series of blow-molds respectively disposed intermediate of adjoining standards in said series; a series of sectoral cross-heads, each supporting one of said blow-molds and each mounted for reciprocation upon two of said standards; a series of blank-molds respectively disposed intermediate of adjoining standards in said series, below said sectoral cross-heads; and a series of blank-mold plungers respectively disposed intermediate of adjoining standards in said series, above said blow-molds; a cylinder secured to said bed-plate, beneath said frame; a press-piston, mounted in said cylinder and arranged to successively uplift each blank-mold of said series, within a corresponding blow-mold, to register with a corresponding mold-plunger; and means to lock said frame in position when a blank-mold is brought into registry with said press-piston, substantially as set forth.

6. In a glass-press, the combination with a stationary bed-plate; of a mold-carrier frame arranged to rotate on said bed-plate; a blow-head mounted on said bed-plate and arranged to reciprocate parallel with the axis of rotation of said frame in eccentric relation therewith; a stationary cylinder and a piston therein concentric with said frame-axis and operatively connected with said blow-head; a series of standards fixed in said frame parallel with its axis of rotation; a series of blow-molds mounted in said frame to reciprocate both parallel with said standards and radially with respect to the axis of rotation of said frame; a series of blank-molds carried by said frame, below said blow-molds; a series of blank-mold plungers carried by said frame, above said blow-molds; a cylinder secured to said bed-plate beneath said frame; and a press-piston therein arranged to successively uplift each blank-mold of said series; said frame being arranged to successively present the blank-molds and mold-plungers in registry with said press-piston, whereby each blank-mold is adapted to be successively raised within its corresponding blow-mold and both of said molds to be put into operative relation with their corresponding mold-plunger, substantially as set forth.

7. In a glass-press, the combination with a stationary bed-plate; of a reciprocatory blow-head, mounted on said bed-plate; means connecting said blow-head with a source of air-supply; a mold-carrier frame arranged to rotate on said bed-plate; a blow-mold arranged to reciprocate vertically and horizontally in said frame; a mold-plunger above said blow-mold in said frame; and a blank-mold arranged to oscillate and reciprocate in said frame, below said blow-mold; said mold-plunger, blank-mold and blow-head being arranged to successively coöperate with said blow-mold, substantially as set forth.

8. In a glass-press, the combination with a stationary bed-plate; of a blow-head mounted on said bed-plate; connections therefrom to a source of air-supply; means to reciprocate said blow-head; a mold-carrier frame arranged to rotate on said bed-plate; a mold-plunger and a blank-mold carried thereby and arranged in axial alinement with each other; a blow-mold also carried by said frame intermediate of said mold-plunger and blank-mold; means to relatively move said molds and plunger parallel to the axis of rotation of said frame to bring them into operative relation; and, means on said frame whereby the blow-mold can be moved transversely to the axis of rotation of said frame to place it out of alinement with said mold-plunger and blank-mold and into alinement with said blow-head, substantially as set forth.

9. In a glass-press, the combination with a bed-plate; of a mold-carrier frame arranged to rotate on said bed-plate; a series of blow-molds carried by said frame; a mold-plunger and a blank-mold carried in substantially axial alinement with each other in said frame respectively above and below the plane of said blow-molds; a blow-head mounted in said bed-plate at a different radial distance from the axis of rotation of said frame than said blank-molds and mold-plunger; means on said frame whereby said blow-mold can be shifted radially in said frame to bring it first into alinement with said blank-mold and mold-plunger and then into alinement with said blow-mold; and, means to move said blank-mold plunger and blow-mold relatively to each other to bring them into operative relation, substantially as set forth.

10. In a glass-press, the combination with a bed-plate; of a mold-carrier frame arranged to rotate on said bed-plate; means for locking said rotary frame in fixed relation with said bed-plate; a mold-plunger in said frame; a plate arranged to oscillate on said rotary frame, to unlock said frame; and a blank-mold mounted on said oscillatory plate and arranged to register with said mold-plunger when said plate is in its unlocking position, substantially as set forth.

11. In a glass-press, the combination with a bed-plate; of a mold-carrier frame, arranged to rotate on said bed-plate; means for locking said rotary frame in fixed relation with said bed-plate; and a plate arranged to oscillate on said rotary frame, to unlock said frame, substantially as set forth.

12. In a glass-press, the combination with a rotatable frame; of a blow-mold, carried by said frame; a mold-plunger above said blow-mold, in said frame; and a blank-mold also mounted in said frame below said blow-mold; said blow-mold and blank-mold being thereby rendered incapable of independent rotation, and said mold-plunger and blank-mold being arranged to coöperate with said blow-mold, substantially as set forth.

13. In a glass-press, the combination with a rotary frame carrying a plurality of blow-molds; of a plurality of mold-plungers above said blow-molds; a plurality of blank-molds below said blow-molds; said blow-mold and blank-mold being thereby rendered incapable of independent rotation, and said mold-plungers and blank-molds being arranged to coöperate with said blow-molds; and a single piston arranged to successively move said blank-molds relatively to said blow-molds and mold-plungers in succession, substantially as set forth.

14. In a glass-press, the combination with a pair of parallel standards; of a cross-head mounted to reciprocate on said standards; a carriage arranged to reciprocate in said cross-head transversely with respect to said standards; a blow-mold mounted on said carriage; a blank-mold disposed beneath said cross-head; a blank-mold plunger disposed above said cross-head; and means to bring said blank-mold and mold-plunger together within said blow-mold, substantially as set forth.

15. In a glass-press, the combination with a movable frame carrying a series of blow-molds and corresponding series of mold-plungers and blank-molds; said mold-plungers and blank-molds being situated respectively above and below said blow-molds and arranged to suitably coöperate therewith to press glass blanks and to deposit them within said blow-molds in succession; a stationary cylinder; a piston therein arranged to successively operate said molds and plungers to perform the said functions; a blow-head; means to reciprocate said blow-head; and, means to carry said blow-molds to successively register with said blank-molds and mold-plungers and then with said blow-head, substantially as set forth.

In testimony whereof we have hereunto signed our names, at Bridgeton, New Jersey, this 28th day of March, 1902.

DAVID L. SHIRLEY.
JESSE O. JOHNSON.

Witnesses:
JESSE C. DAVIS,
JOHNSON HITCHNER.